United States Patent [19]

Johns

[11] 3,758,756

[45] Sept. 11, 1973

[54] MICROMINIATURE CENTER MOUNTABLE ON THE ENGINE

[75] Inventor: Douglas A. Johns, Lake Worth, Fla.

[73] Assignee: Scientific Instruments, Inc., Lake Worth, Fla.

[22] Filed: Jan. 12, 1972

[21] Appl. No.: 217,168

Related U.S. Application Data

[63] Continuation of Ser. No. 23,607, March 30, 1970, abandoned.

[52] U.S. Cl....... 235/92 MT, 235/92 R, 235/92 TC, 73/116
[51] Int. Cl. .............................................. G06m 3/08
[58] Field of Search................... 235/92 MT; 73/116

[56] References Cited
UNITED STATES PATENTS
3,485,093  12/1969  Muller ................................. 73/116

Primary Examiner—Maynard R. Wilbur
Assistant Examiner—Robert F. Gnuse
Attorney—Eugene F. Malin

[57] ABSTRACT

A miniaturized recorder and display device for the compilation of engine operating parameters for mounting within or about an engine housing comprising at least one microminiature control circuit, a plurality of counters and indicators for the various engine parameters, and a heat resistant housing means attachable to the inside or about the engine housing. Input data from operating engine sensors is received by the control circuitry which activates the appropriate indicating dial.

4 Claims, 6 Drawing Figures

MICROMINIATURE CENTER MOUNTABLE ON THE ENGINE

This is a continuation of application Ser. No. 23,607, filed Mar. 30, 1970 now abandoned.

BACKGROUND OF THE INVENTION

This invention relates generally to a miniaturized recording and display device to be mounted and carried inside or adjacent an engine while it is in operation in order to accumulate engine operating data while the engine is operating under actual conditions, such as an aircraft jet engine while inflight, for subsequent use by ground maintenance crews to establish an accurate operating history of the engine.

For example, the efficiency and future reliability of a jet engine can often times be predicated from the accumulated history of the various operating conditions to which it has been subjected. However in the past, the burden of data accumulation has fallen on a human operator, usually the pilot, who operates the engine. This reliance on human compilation usually results in an incomplete history of the various operating data. Usually the pilot is more concerned with maneuvering the aircraft safely and navigating it correctly, so as to not pay extreme attention to the various engine parameters throughout the flight. Inflight recorders, in the past, have been used to monitor the aircraft flight limitations, such as "G" force altitude and air speed, for the purpose of determinating causes of crashes. Such recorders have not found use in keeping a history of engine parameters because of their size and the unreliability of some of their operating characteristics. For example, magnetic recorders would not be advisable for use in a high temperature environment, such as one would encounter within and about an operating jet engine. Applicant provides an inflight engine parameter recording and display device that is to be mounted within or about the confines of the jet engine itself, which is designed to take up as little space as possible, and is non-magnetic in operation so that extreme temperature will not effect its reliability. Such a device can be used for displaying parameters with the proper input signals from sensors mounted on reciprocating, steam, jet, ram-jet, nuclear, or any other type of engine.

BRIEF DESCRIPTION OF THE INVENTION

An inflight engine parameter recording and display device mountable within or about the engine housing comprising electrical input means representing at least one engine operating parameter, a microminiature control circuit coupled to said input means having miniaturized electrical elements, heat resistant indicating and display means coupled to said control circuit, a housing for said control circuit and said indicating means, and a means for attaching the housing device to the engine compartments. Various parameters may be measured, such as engine starting and stopping conditions, critical over temperature conditions, overspeed conditions, total operating time, number of starts, various percentages of engine life based on normal operating temperatures, vibration conditions at different points of the engine such as at the engine mounts; engine parameter inputs are comprised of either variable AC voltages and/or frequencies, or variable DC voltages in the millivolt range. Each input voltage is representative of a different engine operating parameter, and the appropriate corresponding control circuit is coupled to the particular input along with the particular display means in order to produce useful data. The indicating and display means are comprised of: (1) very small bit indicators that display a red (or other brilliant color) shade through a window when a fault occurs as compared to a solid black shade which is the same color as the case when the system is operating properly; or (2) cylindrical, rotating type dials such as counter dials having numbers printed about their circumference from 0 through 9, the numbers being capable of being grouped together to provide a display readout of pertinent data corresponding to a particular engine parameter. For example, the number of starts would be displayed numerically in a counter fashion with the control circuitry designed to provide a counting operation by moving a dial one unit upon receiving the appropriate input signal. The control circuits are comprised of micro-hybrid micro-electronic circuits from which either analogue or digital circuits can be fabricated using diodes, transistors, integrated circuits, and capacitor chips combinated with a wide variety of thin film resistor values providing for a complete circuit. The overall system is designed to operate in temperature ranges varying from a minus 65° Fahrenheit to 200° Fahrenheit and in a pressure environment of 1 PSIA to 25 PSIA, with a short term temperature environment of 400° F for a maximum of 5 minutes. A reset circuit is provided in order to reset displayed information back to an initial zero condition. The entire unit is small enough to allow mounting within the engine spaces of a jet engine itself, the entire unit occupying approximately 3 cubic inches.

It is an object of this invention to provide a microminiature engine parameter recording and display device.

It is another object of this invention to provide an engine parameter recording device that is capable of being mounted within or about the engine confines.

It is still another object of this invention to provide an engine parameter recording that is unaffected by extreme operating temperature and pressure environmental conditions.

And still yet another object of this invention is to provide a recording and display device to replace the necessity of human monitoring and recording of inflight jet engine operating parameters.

In accordance with these and other objects which will be apparent hereinafter, the instant invention will now be described with particular reference to the accompanying drawing.

PREFERRED EMBODIMENT OF THE INVENTION

Figure 1:
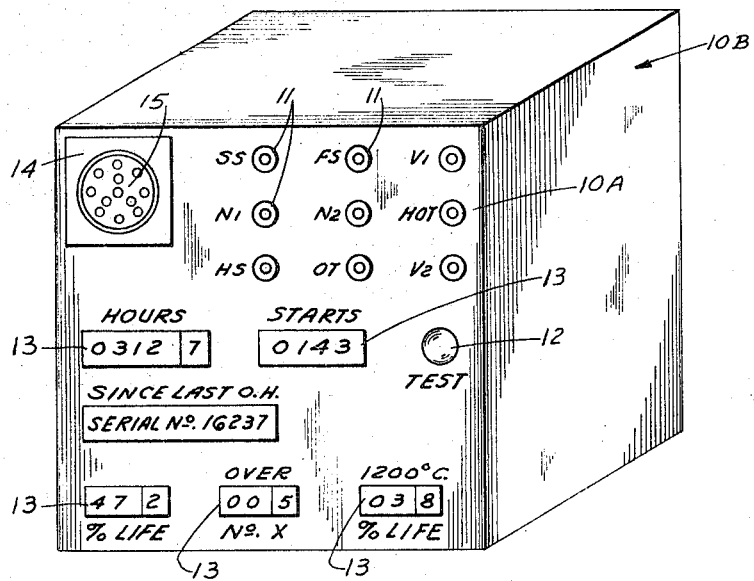
FIG. 1 shows the display face of applicant's device.

Referring now to the drawing and in particular to FIG. 1, the display face 10 is comprised of malfunction bit indicators 11, a test button 12, various numerical display windows 13, and an input jack plug 15 coupled to the facing by connecting plate 14. The particular arrangement of the various indicators on display face is not deemed critical with respect to applicant's invention, but would merely be one of design choice depending upon the particular engine parameters that are to be readout. In this embodiment, various malfunction bit indicators are shown for S.S. (Slow Start), F.S. (Fast Start), V.1 (Vibration) and N.1 (Overspeed), N.2 (Overspeed), H.O.T. (Hot Oil Temperature), HS (Hot Start), O.T. (Over temperature) and V.2 (Vibration). The numerical windows 13 show the total number of hours, total number of starts, the percent of the engine life at normal temperatures, the number of times over a specific high temperature (1200°C in this case), and the percentage of the life operating over a specific high temperature (1200°C in this case). The display organization is important, however, because of the very reduced design size of the device required by the limited operating space available. The face plate 10A is attached to a small housing, essentially a rectangular box, 10B.

Figure 2:
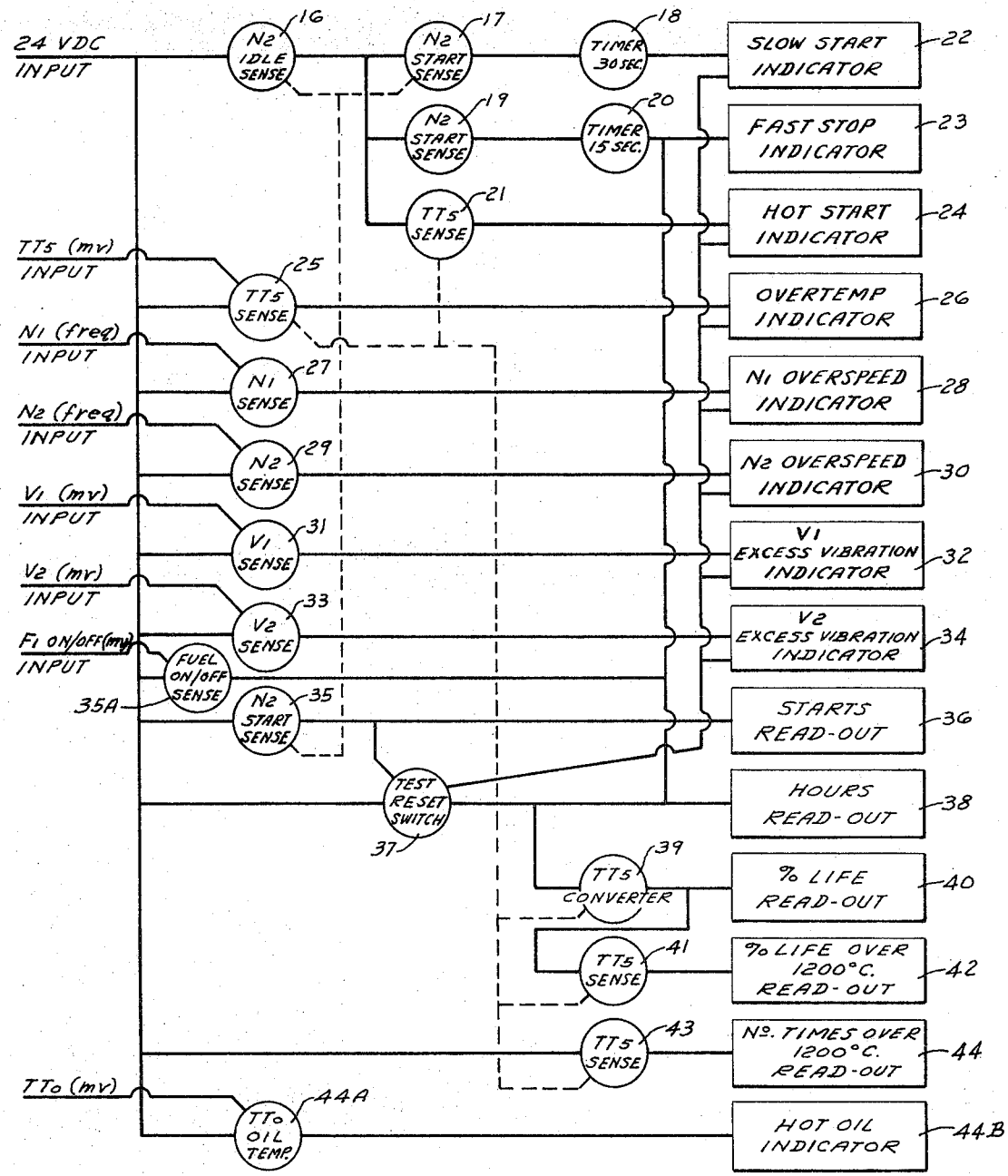
FIG. 2 is a functional schematic showing the relationship of the input means, the control circuits, and indicating means.

Referring now to FIG. 2, one preferred embodiment is shown (functionally) that is suitable for recording and displaying certain parameters important in the operation of a jet engine. Essential information is received from eight particular engine operating areas, namely oil temperature, $TT_0$; turbine temperature, $TT_5$; engine rotation speeds, N.1 and N.2; excess vibration sensors, V.1 and V.2; a fuel on-off switch, $F_1$, with a constant AC voltage of a fixed frequency (400 Hz); and a constant 24 volts D.C. The bit indicators are biased at 24 volts. The $N_1$ and $N_2$ inputs are comprised of variable AC voltages coincident with a variable frequency. The $F_1$ input is a constant amplitude fixed frequency AC voltage, and the other engine inputs $TT_0$, $TT_5$, V.1, and V.2 are variable DC voltages in the millivolt range. The TT5 input is coupled into the TT5 sense circuit indicated at 25 which drives over temperature indicator 26. The N.2 input signal, rotational engine information, is coupled directly to the N2 sense circuits 29, 16, 17, 19, and 35, and signals the slow start indicator 22, fast stop indicator 23, hot start indicator 24, overspeed indicator 30, and number of starts readout 36. N.1 input is coupled directly to the N.1 sense circuit 27 which drives the N.1 overspeed indicator 28. $F_1$ input signal, fuel on-off, is coupled directly to $F_1$ on-off sense circuit 35A, which is a necessary second input to the fast stop indicator 23, the number of starts readout 36, and the total hours readout 38. The remaining DC inputs and their sense circuits 31, 33, and 44A are coupled directly to the respective sensing circuits and indicators 32, 34, and 44B. A test reset switch 37 enables the indicators to be reset to an initial zero condition. TT5 converter 39 provides an AC to DC voltage conversion for use in readout counter 40 (percent life at normal operating temperatures). TT5 sensors indicated at 21, 41, and 43 also provide information to the hot start indicator 24, and the readout counters 42 and 44, percent life over 1,200°C and no. times over 1,200°C, respectively. Timers 18 and 20 represent the length of time required before the signal is pulsed from the timer.

Figure 3:
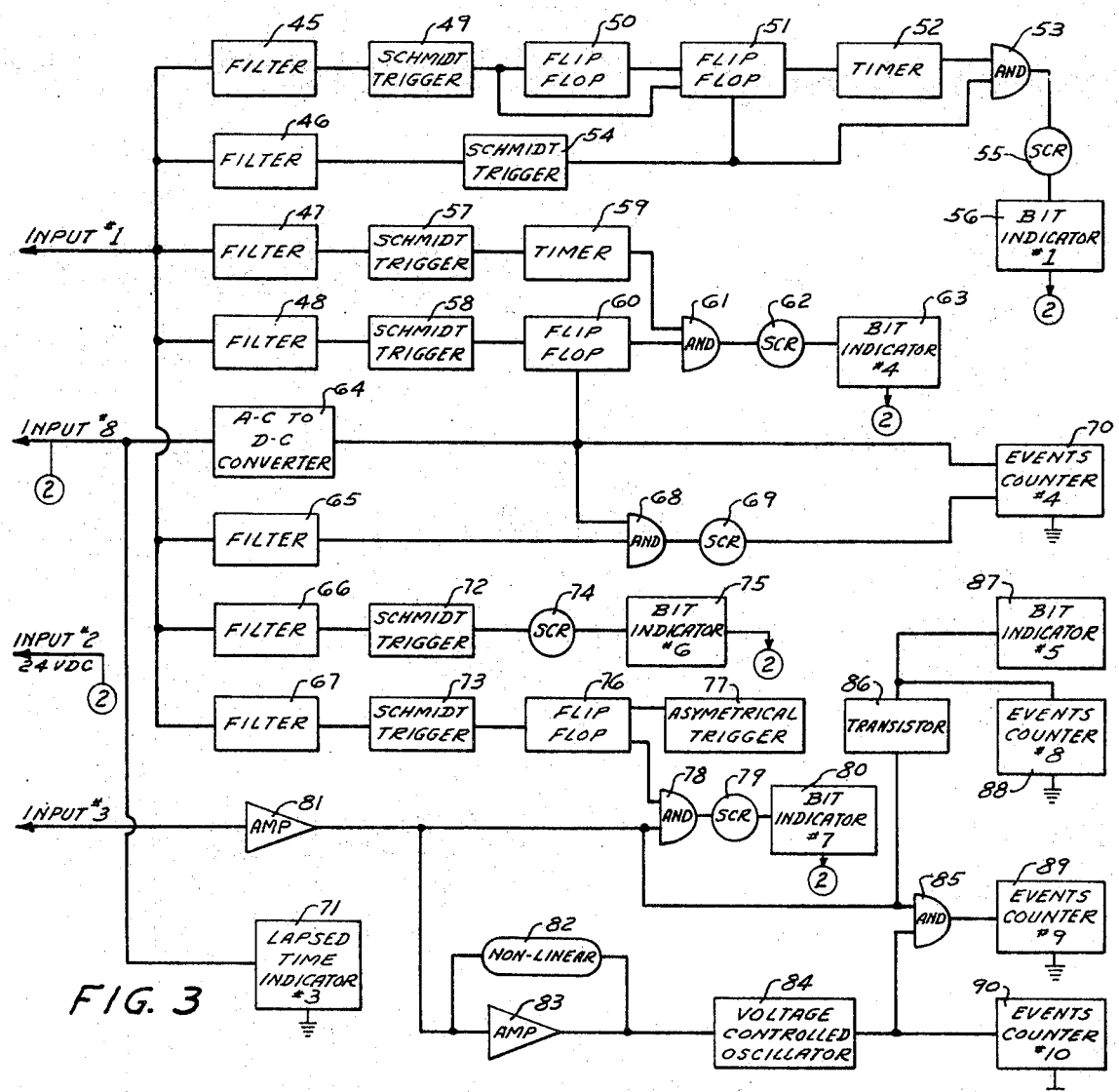
FIGS. 3, 4, 5, and 6 are schematic diagrams showing the various control circuits used in applicant's invention.

Referring now to FIG. 3, a schematic electrical circuit diagram of the various control circuits employed in the preferred embodiment is shown. Most of the engine information to be processed is derived from three inputs comprising No. 1, engine rotational speed information ($N_2$), a variable AC voltage coincident with a variable frequency; No. 8, a fuel on-off signal, a reference signal (that is a constant amplitude fixed frequency AC voltage); and No. 3, turbine temperature (TT5), a variable DC voltage in the millivolt range.

Input No. 1, engine speed, provides a signal to the fast stop indicator, Bit No. 1 at 56; the slow start indicator, Bit No. 2 at 63; and engine overspeed indicator, Bit No. 6 at 75. A fast stop indication is achieved with the input No. 1 signal being filtered by filters 45 and 46 with activate Schmidt triggers 49 and 54 respectively, but only after a certain rotational speeds of the engine are reached. Schmidt trigger 49 triggers flip-flops 50 and 51 pulsing delay timer 52. If proper engine speed is not achieved, AND gate 53 will pulse Silicone Controlled Rectifier 55 which drives the slow start indicator 56, causing the red shade to be displayed in the indicator window. A similar delay filter circuit is employed to illuminate the slow start indicator 63. Active filters 47 and 48 filter input signal No. 1, and when the proper signals are received, Schmidt triggers 57 and 58 are activated, pulsing delay timer 59 and flip-flop 60, respectively. If correct speed is reached, AND gate 61 will allow the appropriate signals to drive SCR 62, thus triggering the red shade in the slow start indicator, Bit Indicator No. 2 at 63. Input No. 8 provides a constant AC signal driving Lapsed Time Indicator 71, giving engine operating hours. Input signal No. 8 is also changed into a DC signal at converter 64 and used with Input No. 1 information to drive Events Counter No. 4, at 70, registering the number of engine starts. Input No. 1 is also coupled to filter 66, Schmidt trigger 72, and SCR 74, which can drive Bit Indicator No. 6, engine overspeed at 75. The filter values are chosen commensurate with the particular circuit, filters 45 and 48 having a center frequency of 1,203 Hz, filters 65, 46, and 47 being 451 Hz, filter 66 being 2,000 Hz, and filter 67 having a value of 1,504 Hz. Input No. 3 from the engine tail pipe temperature is coupled to amplifier 81 to AND gate 78 and SCR 79. The other signal to the AND gate 78 is from Input No. 1. Thus temperature and engine speed information drive Bit Indicator No. 7 at 80 providing low speed over temperature indication. Input No. 3 is also coupled to transistor 86 which drives Bit Indicator No. 5 at 87 indicating an over temperature and Events Counter No. 8 at 88 which provides the number of times over 1,200°C. Coupled to amplifier 81 is another circuit branch comprising amplifier 83 and non-linear element 82 in parallel, and connected to voltage controlled oscillator 84. Non-linear element 82 is derived from active components allowing the feedback to track as a non-linear function with respect to the input voltage. It is designed as separate unit to mate with receptacles on a main integrated circuit block. The voltage controlled oscillator 84 provides a signal to AND gate 85 and Events Counter No. 10 at 90 (percentage engine lift at normal temperature). Events Counter No. 9 at 89 provides percentage of engine life over 1,200°C and is driven when AND gate 85 is activated. The indicators and counters may be reset by asymetrical trigger 77 coupled to flip-flop 76.

Figure 4:
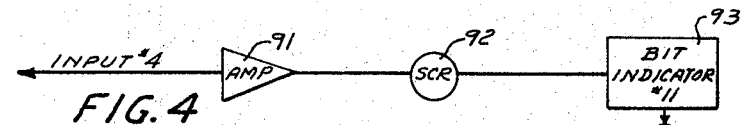
Figure 5:
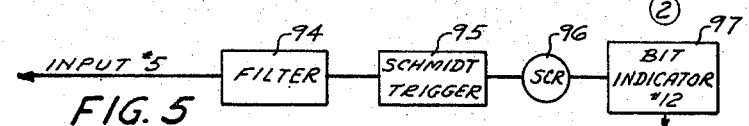
Figure 6:
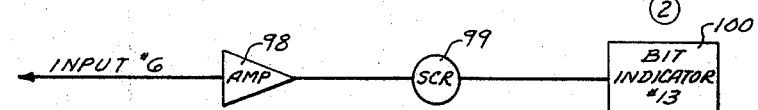

FIG. 4 shows input No. 4, a DC signal from $TT_0$, engine oil temperature sensor, that is amplified at 91, drives the SCR at 92, and triggers the Bit Indicator No. 11 at 93. FIG. 5 shows input No. 5, an AC signal from N.1, another engine speed sensor, that passes through filter 94 to Schmidt trigger 95, driving SCR 96, triggering Bit Indicator No. 12 at 97. This represents another overspeed condition, perhaps of a different turbine stage or section. FIG. 6 shows a pair of control circuits having inputs Nos. 5 and 6, both inputs being DC signals from vibrational sensors located at different points in the engine but similar in operation. The signals are amplified at 98 and 101 driving SCR 99 and 102, respectively. Bit Indicators Nos. 13 and 14 at 100 and 103 respectively, then provide excessive vibrational indications from the points selected.

In operation, the recorder can be mounted in any suitable place in the aircraft but is preferrably placed within the engine confines itself because it is primarily intended for the use of ground maintenance personnel for recording and keeping track of various engine operating conditions. This also reduces the amount of sensing equipment. The recorder will then be accessible to an experienced ground maintenance person only, and in this way the recorder will not be inadvertently set back to an initial zero condition.

In the circuit operation in FIG. 3, the normal operations of transistors will be switching from a cutoff mode to a saturated mode, while all SCRs will pull a lead to ground to complete the circuit. The Events Counters operate off of 24 volt DC with a maximum power of 2 watts, while the elapsed time indicator requires 23 to 29 volts AC at 400 Hz with a nominal power of 0.6 watts. Additional engine parameters may be measured. For example, FIG. 2 shows a control circuit that could indicate hot oil temperature sensed from main gear box oil. This additional circuit would not interfere with the other circuits. The circuits to the Bit Indicators are completed back to Input No. 2, "circled" 2, FIG. 3 or to ground.

Although the preferred embodiment is shown employed with a jet engine, the instrument is capable of displaying parameters with the proper input signals from sensors mounted on any other type of engine. The employment of microminiature subassemblies and monolithic hybrid integrated circuits provides the smallest state of the art package possible for displaying various engine parameters. Because of the small size in packaging design, the unit can be mounted directly on or near the engine structure and would be able to withstand the necessary environmental conditions during engine operation. The instrument will display the various engine parameters during engine operation permitting immediate recording of these events by personnel other than the engine operator.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A microminiature recorder and display device for accumulating jet engine operating information in a high temperature environment comprising:
   first AC signal input means;
   first filter means coupled to said first AC input means;
   second filter means coupled to said first AC input means in parallel with said first filter means;
   first triggering means connected to said first filter means;
   second triggering means connected to said second filter means;
   delay means coupled to said first triggering means;
   AND gate coupled to said delay means and said second triggering means;
   first indicating means; and
   miniaturized means for driving the indicating means coupled to and responsive to signal from said AND gate, whereby said first filter and said second filter pass AC signals of different characteristic values so that the indicating means is responsive to a predetermined time delay between receipt of the characteristic value at the first filter means and the second filter means from the first AC input means.

2. A microminiature recording and display device as in claim 1, including:
   first DC signal input means, the signal representative of a predetermined engine parameter;
   miniaturized means for amplifying said DC input signal coupled to said input means;
   second indicating means; and
   means for driving said second indicating means coupled to and responsive to said smplifying means, whereby a DC input signal representative of a particular engine parameter will be recorded and displayed by said second indicating means.

3. A recording and display device as in claim 2, wherein said first indicating means includes:
   a fault window indicator; and
   heat shielding means encompassing said entire device including said fault window display for protecting said device from exterior temperatures up to 400° Fahrenheit.

4. A recording and display device as in claim 3, wherein said second indicating means includes:
   a plurality of cylindrical rotating dials having numbers printed about their circumference from 0 through 9, the numbers being grouped together to provide a display readout corresponding to the particular input signal.

* * * * *